(12) United States Patent
Ebstyne et al.

(10) Patent No.: US 9,430,038 B2
(45) Date of Patent: Aug. 30, 2016

(54) WORLD-LOCKED DISPLAY QUALITY FEEDBACK

(71) Applicant: MICROSOFT TECHNOLOGY LICENSING, LLC, Redmond, WA (US)

(72) Inventors: Michael John Ebstyne, Seattle, WA (US); Frederik Schaffalitzky, Bellevue, WA (US); Drew Steedly, Redmond, WA (US); Ethan Eade, Seattle, WA (US); Martin Shetter, Bellevue, WA (US); Michael Grabner, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 105 days.

(21) Appl. No.: 14/267,625

(22) Filed: May 1, 2014

(65) Prior Publication Data

US 2015/0317832 A1 Nov. 5, 2015

(51) Int. Cl.
*G06F 3/01* (2006.01)
*G02B 27/00* (2006.01)
*G06T 19/00* (2011.01)
*G02B 27/01* (2006.01)

(52) U.S. Cl.
CPC ........... *G06F 3/011* (2013.01); *G02B 27/0093* (2013.01); *G02B 27/017* (2013.01); *G06T 19/006* (2013.01); *G02B 2027/014* (2013.01); *G02B 2027/0178* (2013.01); *G02B 2027/0187* (2013.01); *G06F 2200/1637* (2013.01)

(58) Field of Classification Search
None
See application file for complete search history.

(56) References Cited

U.S. PATENT DOCUMENTS

| 6,997,882 B1 | 2/2006 | Parker et al. |
| 7,145,478 B2 | 12/2006 | Goncalves et al. |
| 7,831,094 B2 | 11/2010 | Gupta et al. |
| 2010/0232727 A1* | 9/2010 | Engedal ............... G06T 7/0046 382/285 |
| 2012/0092328 A1 | 4/2012 | Flaks et al. |
| 2012/0127284 A1 | 5/2012 | Bar-Zeev et al. |

(Continued)

FOREIGN PATENT DOCUMENTS

WO 2013102774 A1 7/2013

OTHER PUBLICATIONS

Salas-Moreno, Renato F., et al. "Slam++: Simultaneous Localisation and Mapping at the Level of Objects", IEEE Conference on Computer Vision and Pattern Recognition, IEEE, Jun. 2013, 8 pages.

(Continued)

*Primary Examiner* — Edward Martello
(74) *Attorney, Agent, or Firm* — Dan Choi; Judy Yee; Micky Minhas

(57) ABSTRACT

Embodiments that relate to communicating to a user of a head-mounted display device an estimated quality level of a world-lock display mode are disclosed. For example, in one disclosed embodiment a sensor data is received from one or more sensors of the device. Using the sensor data, an estimated pose of the device is determined. Using the estimated pose, one or more virtual objects are displayed via the device in either the world-lock display mode or in a body-lock display mode. One or more of input uncertainty values of the sensor data and pose uncertainty values of the estimated pose are determined. The input uncertainty values and/or pose uncertainty values are mapped to the estimated quality level of the world-lock display mode. Feedback of the estimated quality level is communicated to a user via device.

18 Claims, 9 Drawing Sheets

(56) References Cited

U.S. PATENT DOCUMENTS

| | | |
|---|---|---|
| 2012/0314096 A1 | 12/2012 | Kruglick |
| 2013/0021373 A1 | 1/2013 | Vaught et al. |
| 2013/0083018 A1 | 4/2013 | Geisner et al. |
| 2013/0342570 A1 | 12/2013 | Kinnebrew et al. |
| 2014/0002442 A1 | 1/2014 | Lamb et al. |
| 2014/0327792 A1* | 11/2014 | Mulloni ............... G06T 7/0042 348/211.8 |

OTHER PUBLICATIONS

Newcombe, Richard A., et al. "KinectFusion: Real-Time Dense Surface Mapping and Tracking", 10th IEEE International Symposium on Mixed and Augmented Reality (ISMAR), Oct. 2011, 10 pages.

Zhai, Shumin et al., "Anisotropic Human Performance in Six Degree-of-Freedom Tracking: An Evaluation of Three-Dimensional Display and Control Interfaces", IEEE Transactions on Systems, Man and Cybernetics, Part A: Systems and Humans, vol. 27, No. 4, Jul. 1997, pp. 518-528.

Hallaway, Drexel et al., "Bridging the Gaps: Hybrid Tracking for Adaptive Mobile Augmented Reality", Applied Artificial Intelligence vol. 18, No. 6, Jul. 2004, pp. 477-500.

Eissele, Mike et al., "Context-Controlled Flow Visualization in Augmented Reality." Proceedings of Graphics Interface 2008. Canadian Information Processing Society, May 2008. 8 pages.

Broll, Wolfgang et al., "The Virtual Round Table-a Collaborative Augmented Multi-User Environment", Proceedings of the Third International Conference on Collaborative Virtual Environments, Sep. 2000, 7 pages.

Azuma, Ronald, et al. "Tracking in Unprepared Environments for Augmented Reality Systems", Computers & Graphics, vol. 23, No. 6, Nov. 1999, pp. 787-793.

ISA European Patent Office, International Search Report and Written Opinion Issued in Application No. PCT/US2015/028382, Aug. 17, 2015, WIPO, 11 pages.

* cited by examiner

WORLD-LOCKED DISPLAY QUALITY FEEDBACK

BACKGROUND

Various technologies may allow a user to experience a mix of real and virtual reality. For example, some display devices, such as various head-mounted display (HMD) devices, may comprise a see-through display that allows superposition of virtual objects over a real-world environment. The virtual objects may appear integrated with the real-world environment when viewed by a wearer of the HMD device through the see-through display. Such a relationship between the virtual objects and the real-world environment may be referred to as augmented reality.

Simultaneous localization and mapping systems may provide augmented reality experiences. Typically, such tracking and mapping systems are dependent upon illumination and other visual aspects of the environment in which the user is operating. When the environment does not offer sufficient data to support tracking and mapping, applications or technologies may fail to operate, or may operate with a significant degradation in the user experience.

Users may utilize such tracking and mapping systems in a variety of real-world environments and in dynamic environments with varying amounts of data to support tracking and mapping. In some cases, a user may expect to use a tracking and mapping system to execute an augmented reality application in a particular environment. However, the environment may provide insufficient data to support effective tracking and mapping, causing the application to perform poorly and provide a disappointing user experience or to fail completely. Having limited or no information regarding the quality of the environment as it relates to a tracking and mapping system, the user may be unpleasantly surprised with the user experience. Further, a user may prevented from adjusting expectations of the user experience and/or choosing another activity or other application that may operate more efficiently.

SUMMARY

Various embodiments are disclosed herein that relate to communicating to a user of a head-mounted display device an estimated quality level of a world-lock display mode in which a position of one or more virtual objects appears to be fixed relative to real-world objects viewable through the head-mounted display device. For example, one disclosed embodiment provides a method comprising receiving sensor data from one or more sensors of the head-mounted display device. Using the sensor data, an estimated pose of the head-mounted display device is determined.

Using the estimated pose, one or more virtual objects are displayed via the head-mounted display device in either the world-lock display mode or in a body-lock display mode in which the position of each of the virtual objects appears to be fixed relative to the user of the head-mounted display device. One or more input uncertainty values of the sensor data and pose uncertainty values of the estimated pose are determined. One or more of the input uncertainty values and the pose uncertainty values are mapped to the estimated quality level of the world-lock display mode. Feedback of the estimated quality level is communicated to the user via the head-mounted display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
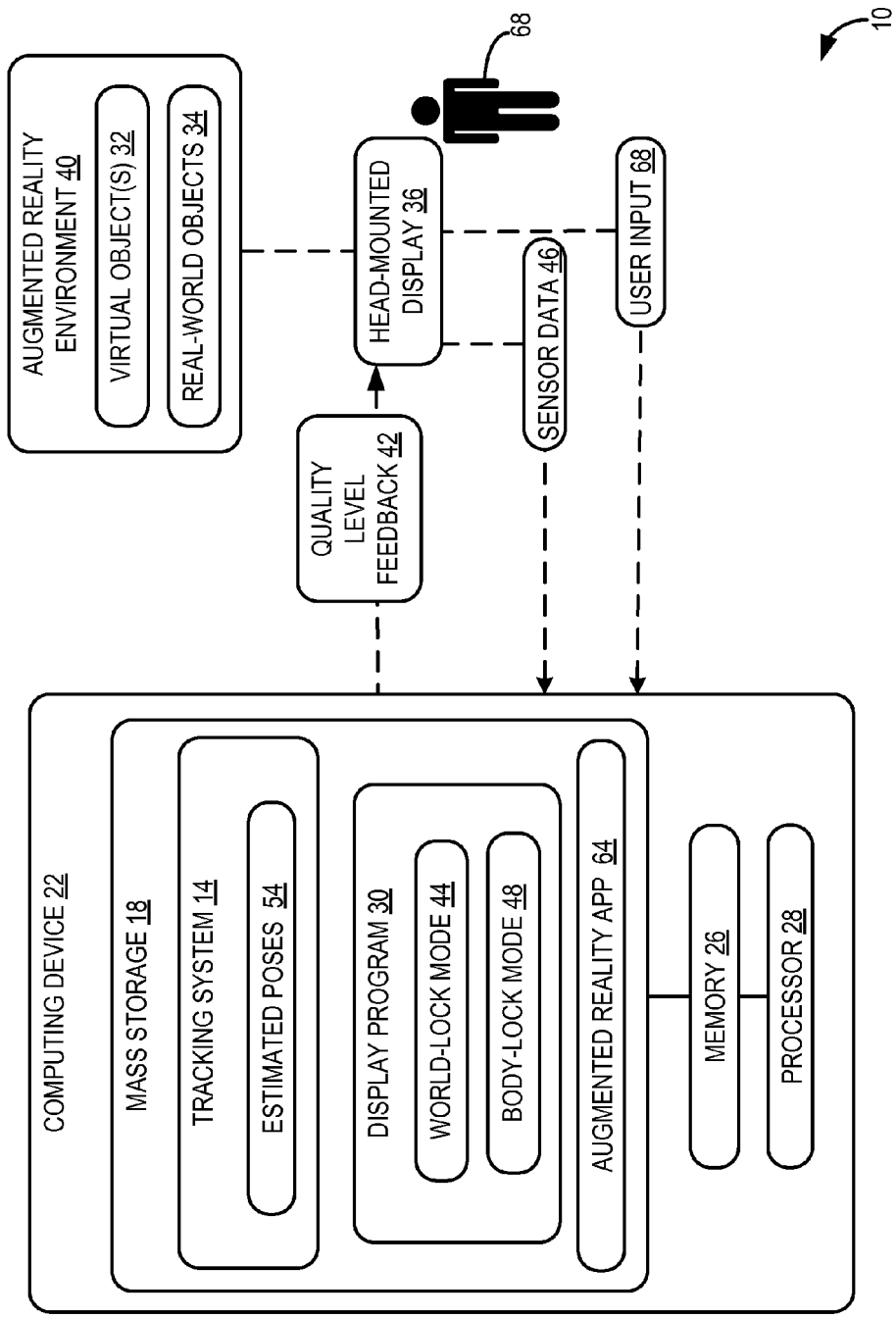
FIG. 1 is a schematic view of an augmented reality system according to an embodiment of the present disclosure.

FIG. 1 shows a schematic view of one embodiment of an augmented reality system 10. The augmented reality system 10 includes a tracking system 14 that may be stored in mass storage 18 of a computing device 22. The tracking system 14 may be loaded into memory 26 and executed by a processor 28 of the computing device 22 to perform one or more of the methods and processes described in more detail below.

The augmented reality system 10 includes a display program 30 that may generate one or more virtual objects 32 for display within a real-world environment including one or more real-world objects 34. A display device, such as a head-mounted display (HMD) device 36, may display the virtual objects 32 in superposition over a real-world environment to create an augmented reality environment 40. As described in more detail below, the display program 30 may utilize two different display modes for displaying the virtual objects 32.

More particularly, in a world-lock display mode 44 one or more virtual objects 32 may be displayed via the HMD device 36 with world-locked positions. In a world-locked position, a virtual object 32 appears to be fixed relative to real-world objects 34 viewable through the HMD device 36, and the world-locked position of each virtual object appears to be moveable relative to a wearer of the HMD device 36. With reference also to the tracking system 14 shown in FIG. 8, the world-lock display mode 44 may be associated with a six degree of freedom (6DOF) tracking filter 816 that estimates a location and an orientation of the HMD device 36 in six degrees of freedom (e.g., x, y, z, pitch, roll, yaw).

For example, the estimate in six degrees of freedom may be determined using sensor data 46 from a combination of optical sensors of the HMD device 36 and other pose sensors of the HMD device that do not rely merely on optical information. Such other pose sensors may include, but are not limited to, accelerometers, gyroscopes, magnetometers, and other sensors used in deduced reckoning of a current position/orientation by using one or more previously determined positions/orientations and known or estimated changes over designated time periods.

The optical sensors may provide image information of optical features of a real-world environment in which the HMD device 36 is located. As noted above, due to the reliance on illumination conditions, optical features, and other visual aspects of the real-world environment in which the user is operating, the accuracy of the sensor data 46 from the optical sensors may vary and may not be reliable. When conditions are suitable to provide accurate sensor data, however, the augmented reality experience provided by the world-lock display mode 44 may be rich and compelling.

When conditions are not suitable to consistently display virtual objects 32 with world-locked positions in the world-lock display mode 44, and for applications that do not support a world-lock display mode, the HMD device 36 may operate in a body-lock display mode 48. In the body-lock display mode 48, one or more virtual objects 32 may be displayed via the HMD device 36 with body-locked positions. In a body-locked position, a virtual object 32 appears to be fixed relative to the wearer of the HMD device 36, and the body-locked position of each virtual object appears to be moveable relative to the real-world objects 34.

The body-lock display mode 48 may be associated with a three degree of freedom (3DOF) tracking filter 820 that may operate in parallel with the 6DOF tracking filter 816. The 3DOF tracking filter 820 estimates an orientation of the HMD device 36 in three degrees of freedom (e.g., pitch, roll, yaw). For example, the estimate in three degrees of freedom may be determined using information from pose sensors that do not rely on optical data. Accordingly, the 3DOF tracking filter 820 may operate consistently during conditions in which the 6DOF tracking filter 816 may provide a degraded augmented reality experience.

With reference again to FIG. 1, the computing device 22 may be operatively connected with the HMD device 36 using a wired connection, or may employ a wireless connection via WiFi, Bluetooth, or any other suitable wireless communication protocol. Additionally, the example illustrated in FIG. 1 shows the computing device 22 as a separate component from the HMD device 36. It will be appreciated that in other examples the computing device 22 may be integrated into the HMD device 36.

In some examples, the computing device 22 may take the form of a desktop computing device, a mobile computing device such as a smart phone, laptop, notebook or tablet computer, network computer, home entertainment computer, interactive television, set-top box, gaming system, or other suitable type of computing device. Additional details regarding the components and computing aspects of the computing device 22 are described in more detail below with reference to FIG. 11.

As described in more detail below, the tracking system 14 may be configured to communicate feedback 42 of an estimated quality level of a world-lock display mode 44 to a user 50 wearing the HMD device 36. Advantageously, in this manner the user 50 may be apprised in real-time of current environmental conditions and their effect on the quality and/or availability of a world-lock display mode user experience.

With reference now to FIGS. 2-7, example use cases of the augmented reality system 10 and tracking system 14 will now be described. In the examples shown in FIGS. 2 and 3, because conditions of the real-world environment are above a quality level threshold, the world-lock display mode 44 may be utilized. The quality level threshold may correspond to a minimum amount and/or quality of sensor data for providing an acceptable user experience in the world-lock display mode 44. It will be appreciated that the amount and/or quality of available sensor data can vary considerably from one environment to another. Accordingly, appropriate quality level thresholds will also vary and will be readily determined by the skilled practitioner.

Figure 2:
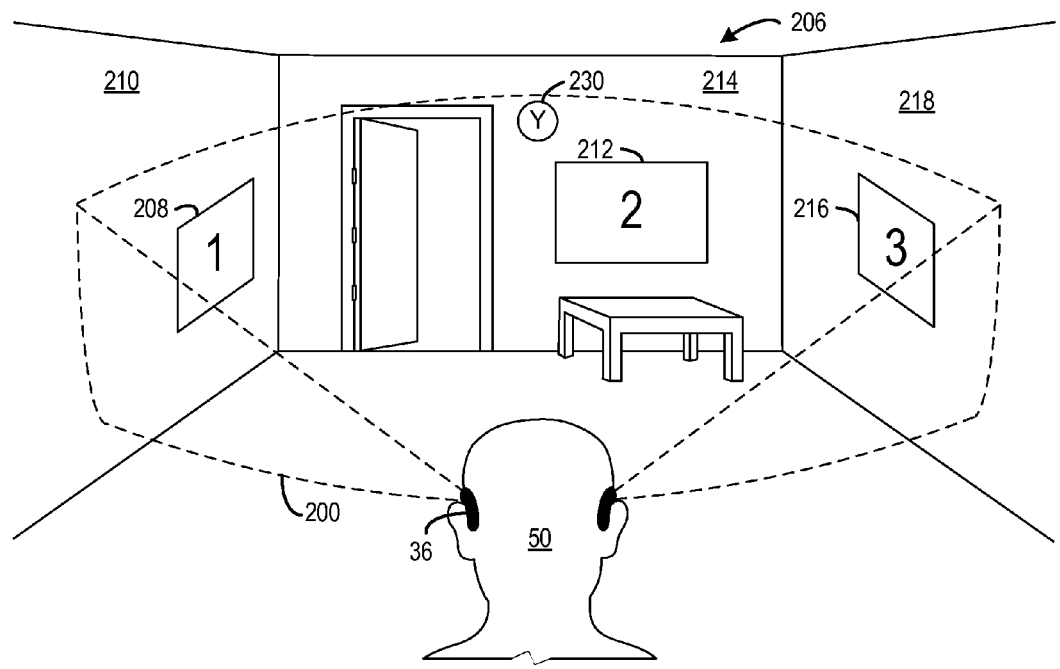
FIGS. 2 and 3 show a plurality of virtual objects with a world-locked position in accordance with an embodiment of the present disclosure.

In FIG. 2, a first video slate 208 appears to be hanging on a left-side wall 210 of the room 206 relative to the location and orientation of the user 50 of the HMD device 36. A second video slate 212 appears to be hanging on a front facing wall 214 of the room 206 relative to the location and orientation of the user 50 of the HMD device 36. A third video slate 216 appears to be hanging on a right-side wall 218 relative to the location and orientation of the user 50 of the HMD device 36.

Figure 3:
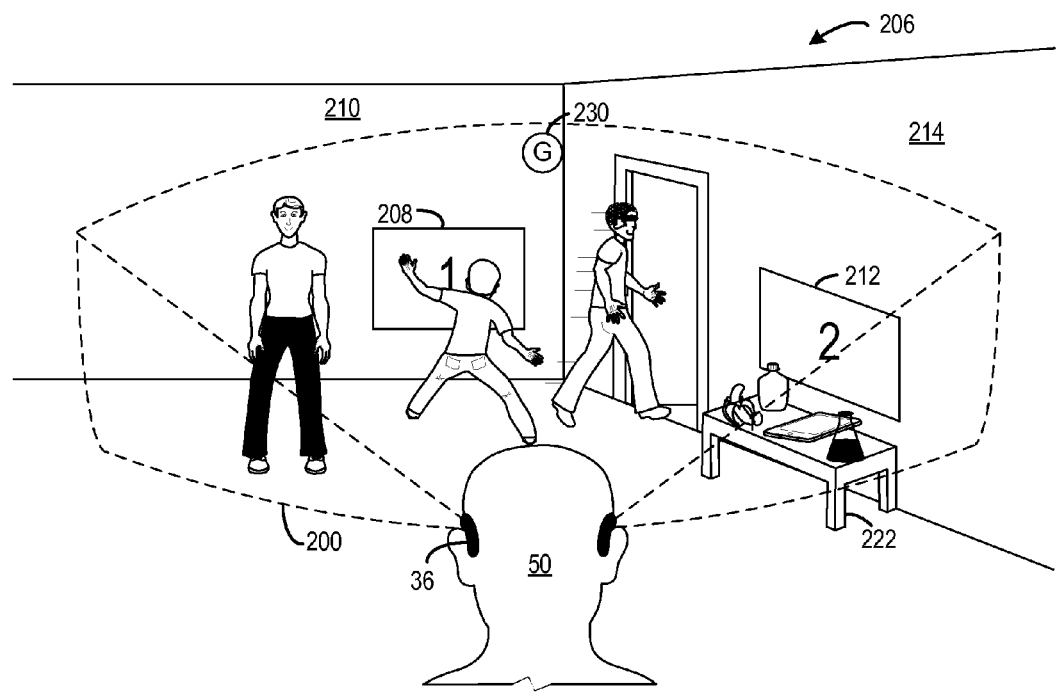

In FIG. 3, the user 50 of the HMD device 36 has moved to the right and rotated to the left, so that he/she is facing the wall 210 and the location and the orientation of the HMD device changes accordingly. Additionally, several people have entered the room and a variety of items have been placed on the table 222 below the second video slate 212. As the HMD device 36 is operating in the world-lock display mode 44 and the video slates correspondingly have world-locked positions, the first video slate 208 appears to be fixed on the wall 210 relative to the other real-world objects and to the second video slate 212 as viewed through the HMD device 36. Likewise, the second video slate 212 appears to be fixed on the wall 214 relative to the other real-world objects and to the first video slate 208 as viewed through the HMD device 36. Correspondingly, the world-locked position of each of the first and second video slates appears to move relative to the user 50 as the user moves.

It will be appreciated that the HMD device 36 may display any suitable number of video slates or other virtual objects 32 having world-locked positions. The video slates may present any suitable video or other images. For example, the video slates may present one or more web pages, email applications, weather reports, television, news, photographs, etc.

It will also be understood that the video slates may be located in any suitable world-locked position within the room. In some embodiments, the video slates may be displayed according to a predefined visual layout which may be location-specific. For example, optical sensor data from the tracking system 14 may be used to recognize that the real-world environment is a particular location, such as the user's office. Accordingly, the video slates may be placed in particular locations within the office according to a location-specific visual layout. On the other hand, if a real-world environment is unrecognized, the video slates may be placed according to a default visual layout. In other embodiments, the visual layout may be location independent, and the video slates may be displayed in the same world-locked positions in any location while operating in the world-lock display mode 44.

With reference again to FIG. 1 and as described in more detail below, the tracking system 14 utilizes sensor data 46 received from the room 206 to determine an estimated pose 54 of the HMD device 36. This estimated pose is then used to display the video slates in their world-locked positions.

The tracking system 14 may analyze the sensor data 46 to determine one or more input uncertainty values associated with the sensor data. As noted above, a variety of environmental factors may influence uncertainty associated with sensor data. Such factors may include, but are not limited to, illumination of real-world objects, scene depth, scene motion, and feature density (e.g., scene clutter). Similarly, the tracking system 14 may analyze the estimated pose 54 to determine one or more pose uncertainty values of the estimated pose.

The tracking system 14 may then map one or more of the input uncertainty values and the pose uncertainty values to one of a plurality of estimated quality levels of the world-lock display mode 44. Advantageously, the tracking system 14 may then communicate feedback 42 of the estimated quality level to the user 50 via the HMD device 36.

In some examples, the feedback 42 may comprise displaying one or more graphical representations of the estimated quality level via the HMD device 36. With reference now to FIG. 2, in one example feedback 42 of the estimated quality levels may comprise a circle 230 displayed within the field of view 200 of the HMD device 36. The circle 230 may be displayed in one of a plurality of different colors, with each color corresponding to different estimated quality level of the world-lock display mode 44. For example, five colors and corresponding estimated quality levels may be utilized, such as (1) Red/Unavailable, (2) Purple/Poor, (3) Yellow/Fair, (4) Blue/Good, and (5) Green/Excellent. It will be appreciated that any suitable number of quality levels and corresponding colors, and any other types and forms of graphical representations may be utilized and are within the scope of the present disclosure.

In the example of FIG. 2, the real-world objects in the room 206 may provide a low amount of feature density (or scene clutter) in image data collected by the HMD device 36. The tracking system 14 may determine that such lower amount of feature density in this environment, perhaps along with one or more other environmental aspects, will yield a Fair estimated quality level of a world-lock display mode experience. Accordingly and to alert the user 50, the tracking system 14 may display a Yellow (Y) circle 230 via the HMD device 36.

In the example of FIG. 3, the additional people and other real-world objects in the room 206 may provide an enhanced feature density in image data collected by the HMD device 36. The tracking system 14 may determine that such greater feature density will yield an Excellent estimated quality level. Accordingly and to alert the user 50, the tracking system 14 may display a Green (G) circle 230 via the HMD device 36 corresponding to an Excellent estimated quality level of a world-lock display mode experience.

Figure 4:
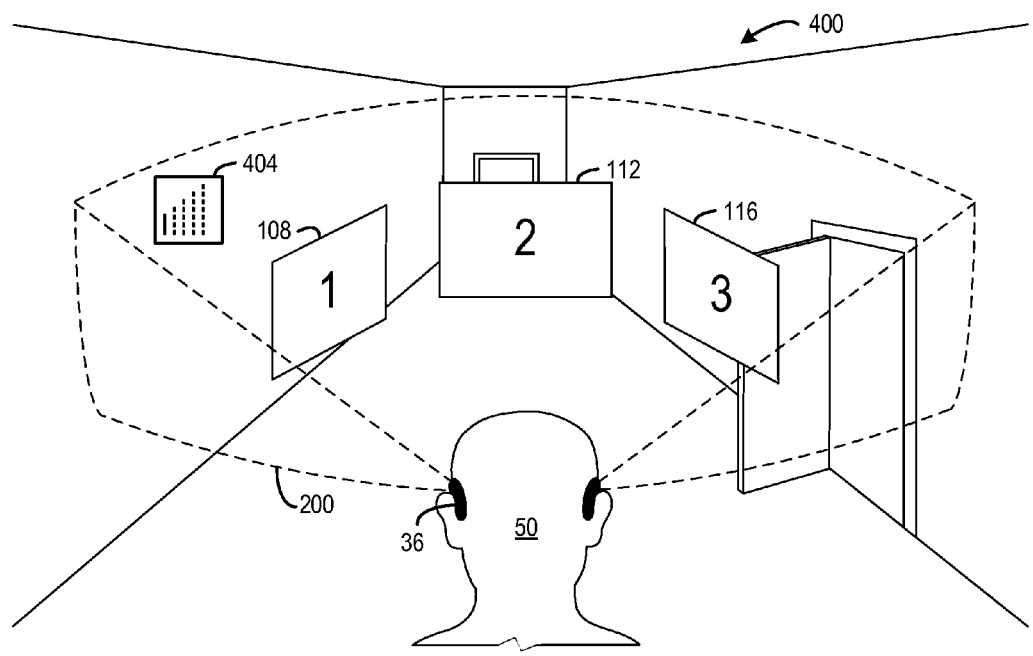
FIGS. 4 and 5 show a plurality of virtual objects with a body-locked position in accordance with an embodiment of the present disclosure.
Figure 5:
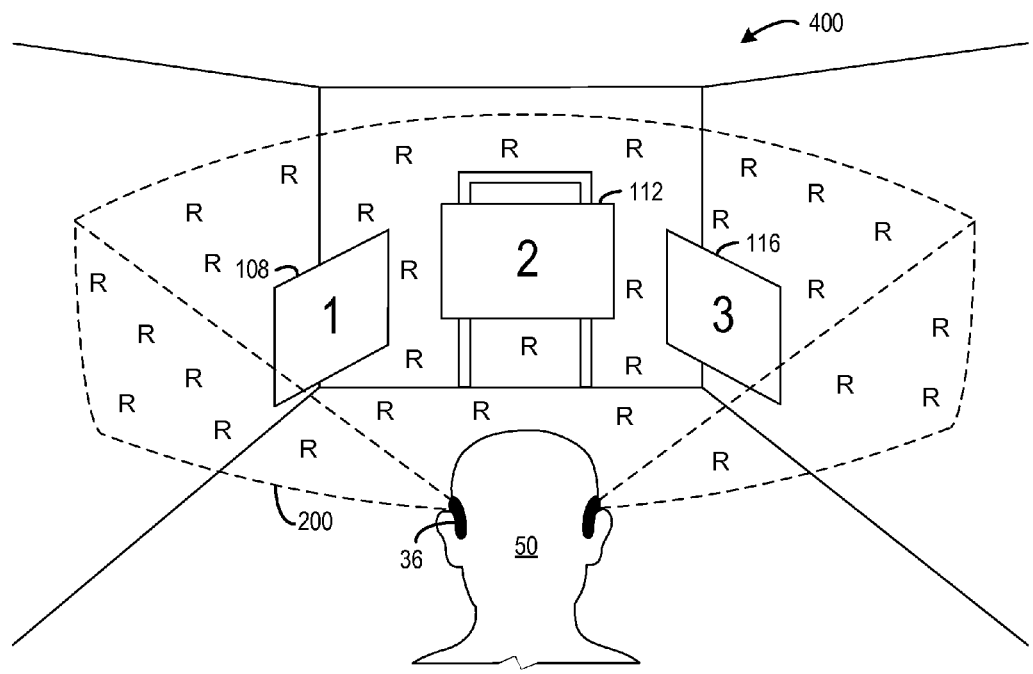

In the examples of FIGS. 4 and 5, the user 50 of the HMD device 36 has moved through the doorway of the room 206 shown in FIGS. 2 and 3 and into a hallway 400. In this example, illumination conditions of the hallway 400 and its features may be very poor. Accordingly, image data collected by the HMD device 36 may be characterized by low resolution yielding, for example, poor texture of the hallway 400 and its features. The tracking system 14 may determine that such poor illumination conditions, perhaps along with one or more other environmental factors, will yield an Unavailable estimated quality level for the world-lock display mode 44; e.g., the HMD device 36 cannot operate in the world-lock display mode.

Accordingly and to alert the user 50, the tracking system 14 may display a bar graph indicator 404 via the HMD device 36 that conveys the Unavailable estimated quality level by displaying one of five possible bars. In some examples, the tracking system 14 may be configured to disable the world lock display mode 44 when the estimated quality level is below a predetermined quality level threshold.

As the world-lock display mode 44 is unavailable, the HMD device 36 may operate in the body-lock display mode 48. In the body-lock display mode 48, the plurality of video slates may be displayed in the field of view 200 with body-locked positions. For example, the plurality of video slates may appear in a spherical workspace layout where the user 50 of the HMD device 36 stands in the center of the sphere with the plurality of video slates surrounding him/her. In some embodiments, the plurality of video slates may be arranged according to a predefined visual layout. In one particular example, a news application could be displayed in the first video slate on the left-side, an email application could be displayed on in the second video slate in the middle, and a stock ticker application could be displayed in the third video slate on the right-side.

In FIG. 4, the user 50 of the HMD device 36 is standing in the hallway 400 and next to the doorway from the room 206. The plurality of video slates is displayed in the field of view 200 with body-locked positions that appear to be fixed relative to the user 50 and moveable relative to real-world objects, such as the doorway.

In FIG. 5, the user 50 of the HMD device 36 has walked down to the end of the hallway 400 and is standing in front of another doorway. Since the plurality of video slates are displayed via the HMD device 36 with body-locked positions, the plurality of video slates stay fixed relative to the user 50 even as he/she walks down the hallway. In other words, the slates move with the user 50.

FIG. 5 also illustrates another example of communicating feedback 42 of the estimated quality level of the world-lock display mode 44 to the user 50 in which an appearance of the field of view 200 is altered. In FIG. 5, the tracking system 14 highlights the field of view 200 with a red tint (indicated by the plurality of R's) to communicate that the world-lock display mode 44 is Unavailable. When the estimated quality level changes, the highlighting of the field of view 200 may correspondingly change to one of the other four colors mentioned above. It will also be appreciated that any other suitable form and/or manner of altering the appearance of the field of view 200 may be utilized such as, for example, displaying transparent watermarks corresponding to an estimated quality level.

Figure 6:
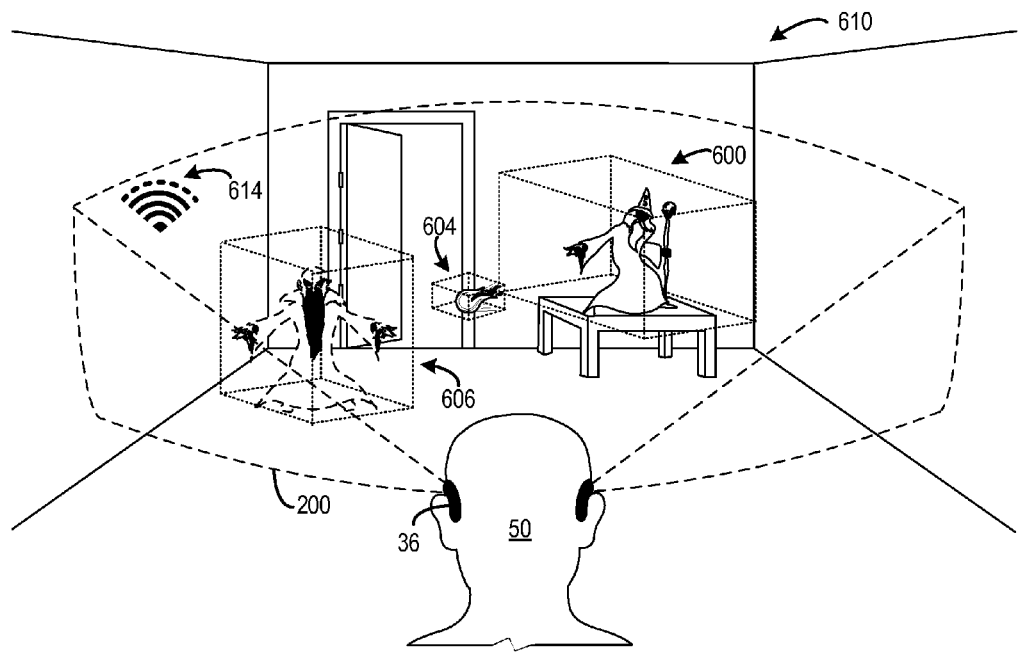
FIG. 6 shows a plurality of virtual objects as volumetric holograms with world-locked positions in accordance with an embodiment of the present disclosure.
Figure 7:
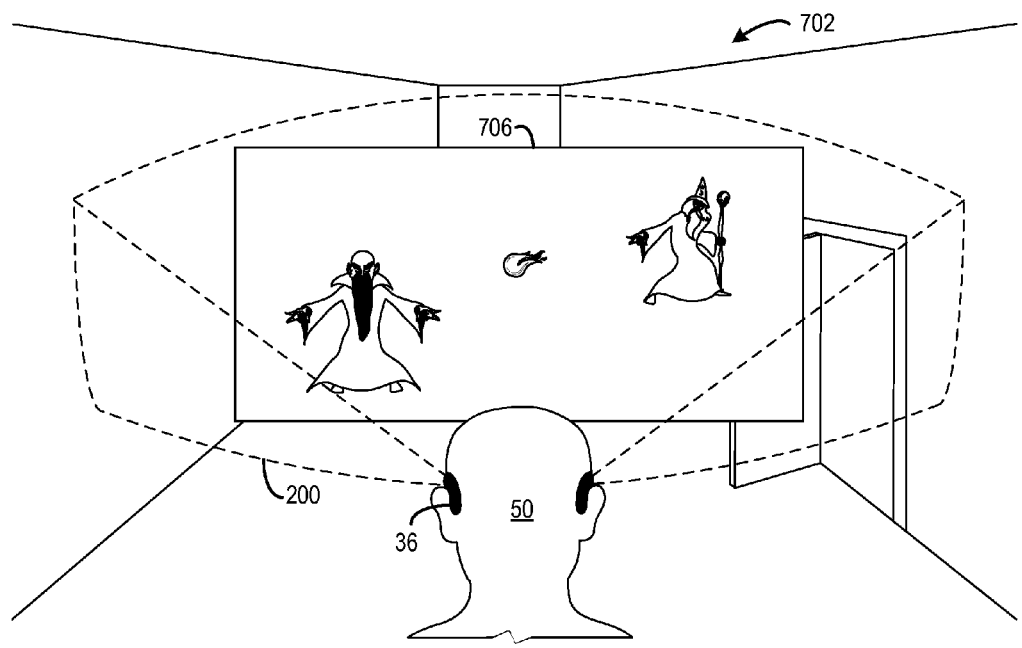
FIG. 7 shows a plurality of virtual objects displayed in a screen viewport with a body-locked position in accordance with an embodiment of the present disclosure.

FIGS. 6 and 7 show an example scenario in which a plurality of virtual objects are shown in a 3D view in the world-lock display mode 44 and then visually transition to a 2D view in the body-lock display mode 48. In FIG. 6, the HMD device 36 is operating in the world-lock display mode 44 in which a plurality of virtual objects in the form of volumetric holograms (e.g., 3D meshes) of a good wizard 600, fireball 604 and evil wizard 606 may be displayed via the HMD device 36 in a 3D view. The volumetric holograms may have world-locked positions in the real-world environment (e.g., a room) 610 and may appear to occupy a volume within the real-world environment.

FIG. 6 also illustrates an example of displaying a graphical representation of the estimated quality level in the form of a plurality of ¼ circle indicators 614, showing in this example four out of five indicators corresponding to a Good estimated quality level. In one example, the plurality of ¼ circle indicators 614 may be displayed in the world-lock display mode 44 along with the virtual objects. In another example, the plurality of ¼ circle indicators 614 may be displayed in the body-lock display mode 48 such that the indicators appear to be fixed relative to the user and remain in the user's view regardless of user movement or orientation in the real-world environment.

In FIG. 7, the user 50 of the HMD device 36 has walked through the doorway of the room 610 and into a small hallway 702. The small hallway 702 may provide a very limited scene depth within which the sensors of the HMD device 36 may capture sensor data 46. Where the scene depth of the small hallway 702 is below a minimum scene depth threshold, the resulting uncertainties of the sensor data and corresponding estimated poses 54 may yield an unacceptable estimated quality level of the world-lock display mode 44.

Accordingly, when the user 50 enters the hallway 702, the tracking system 14 may switch from the world-lock display mode 44 to the body-lock display mode 48. In response, the volumetric meshes may visually transition from the 3D view to a 2D view. In one example, the volumetric meshes may collapse to a 2D view of a video slate 706. The video slate 706 may be a screen viewport of a virtual world that the virtual objects inhabit. The video slate 706 may have a body-locked position and the virtual objects may move within the virtual world depicted in the video slate.

In another example, one or more sensors of the HMD device 36 may be at least partially obscured by hair of the user, a hand or arm of the user, and/or a hat worn by the user. In this example, sensor data 46 from the one or more sensors may be analyzed to detect visual indicators of user hair, a hand or arm of the user, and/or a hat worn by the user. Based on such analysis, input uncertainty values may be determined. For example, where image data reveals a hat brim obscuring more than 50% of the field of view of an image sensor, the tracking system 14 may determine that such conditions will yield an Unavailable estimated quality level for the world-lock display mode 44.

In another example, the feedback 42 of the estimated quality level of the world-lock display mode 44 may comprise altering the appearance of one or more virtual objects 32. With reference again to FIG. 6, in one example where the estimated quality level drops from a first level to a second lower level, the volumetric hologram of the evil wizard 606 may be made transparent to indicate a lower estimated quality level. In other examples, one or more of the volumetric holograms or 2D images may be displayed in a particular color to indicate a corresponding estimated quality level. In other examples, one or more of the holograms or images may be displayed to appear to quiver or otherwise visually vibrate to indicate a corresponding estimated quality level. It will be appreciated that the foregoing examples are not exclusive, and that many other examples of altering the appearance of one or more virtual objects 32 may be utilized.

In other examples and with reference again to FIG. 1, the tracking system 14 may provide the estimated quality level to another application, such augmented reality application 64, that utilizes the world-lock display mode 44 and body-lock display mode 48. The application may then convey feedback 42 of the estimated quality level to the user 50 via the HMD device 36. For example, the augmented reality application 64 may engage the tracking system 14 via an application programming interface (API) and may query the tracking system 14 regarding the availability and/or estimated quality of the world-lock display mode 44. Based on the response to the query, the augmented reality application 64 may determine the type and/or manner of feedback 42 of the estimated quality level to deliver to the user 50. For example, the augmented reality application 64 may provide audio feedback to the user 50 via the HMD device 36, such as vocalizing, "World-lock mode isn't available at the moment."

In other examples, the tracking system 14 or other application may refrain from communicating feedback 42 of an estimated quality level of the world-lock display mode 44 until a user input 68 is received from the user 50 that calls for the world-lock display mode. In one example, the tracking system 14 may operate by default in the body-lock display mode 48 and may not provide feedback 42 of an estimated quality level of the world-lock display mode 44 while in this mode. The user 50 may then make a request, take an action, or otherwise interact with the augmented reality application 64 in a manner that calls for the world-lock display mode 44. For example and with reference to FIGS. 6 and 7, the user 50 may walk from the small hallway 702, where the world-lock display mode 44 is not available, back into the room 610 where the world-lock display mode 44 is available. Accordingly, the augmented reality application 64 and tracking system 14 may then display the ¼ circle indicators showing a Good estimated quality level.

It will be appreciated that many other forms of user input 68 may be used to trigger the display of the feedback 42 of an estimated quality level. In some examples, such user input 68 may be passive, such as the example above of the user 50 walking from the hallway 702 into the room 610. In other examples, the user input 68 may be explicit, such as the user 50 speaking verbal instructions to launch an augmented reality application 64 that utilizes the world-lock display mode 44.

Figure 8:
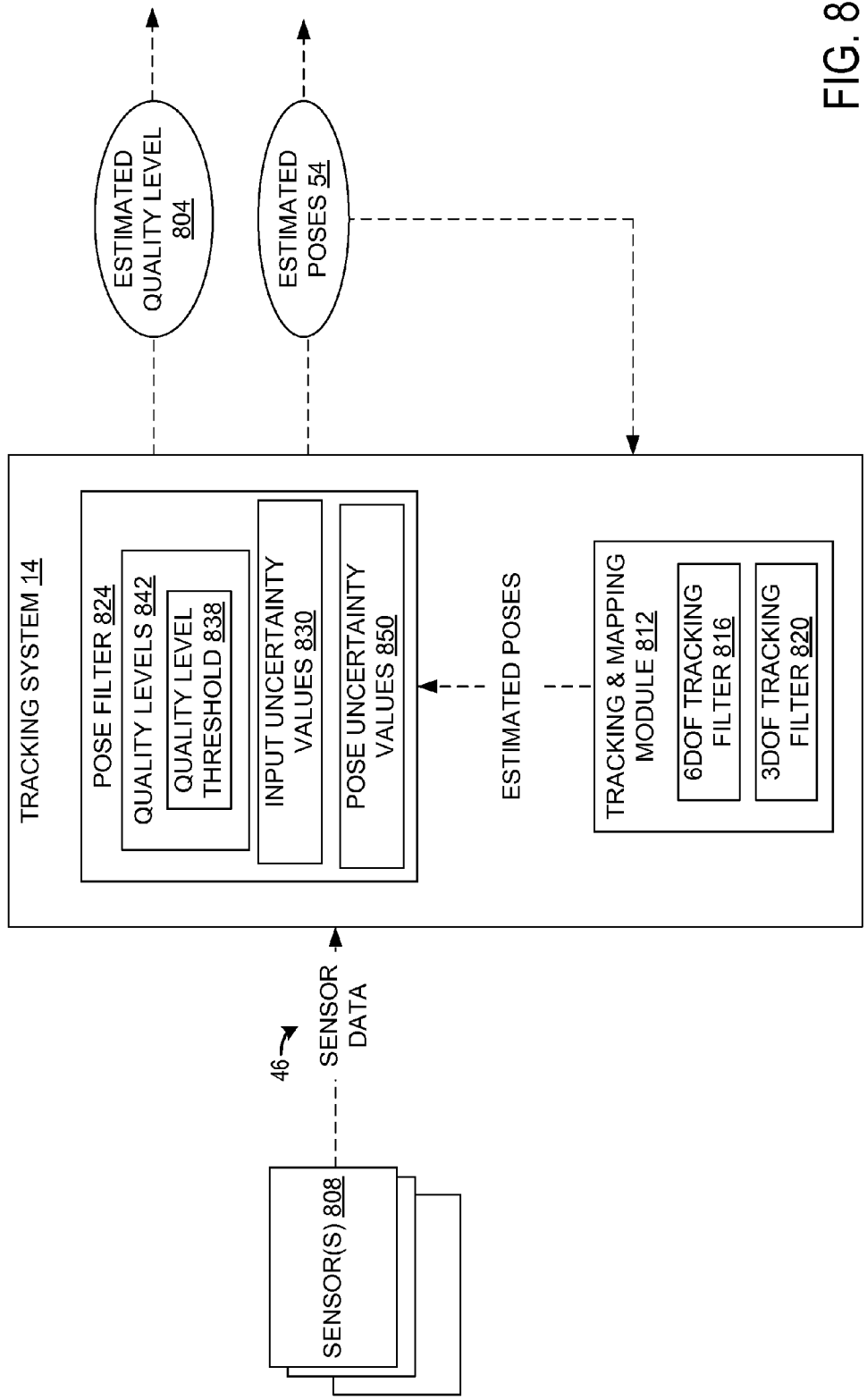
FIG. 8 is a schematic view of a tracking system according to an embodiment of the present disclosure.

Turning now to FIG. 8, a schematic illustration of an example tracking system 14 of HMD device 36 in accordance with an embodiment of the present disclosure is provided. As noted above, the tracking system 14 may be configured to determine estimated poses 54 of the HMD device 36 along with an estimated quality level 804 of a world-lock display mode 44. More particularly, the tracking system 14 may utilize sensor data 46 from the HMD device 36 to provide a filtered running estimate of the actual pose of the HMD device. These estimated poses 54 may be used to display virtual objects 32 in world-locked positions. Feedback 42 of the estimated quality level 804 may be communicated to a user 50 of the HMD device 86.

The tracking system 14 may receive sensor data 46 from a plurality of sensors 808 located on HMD device 36 and/or computing device 22. The sensor data 46 may provide location and orientation information in six degrees of freedom (e.g., x, y, z, pitch, roll, yaw). For example, the plurality of sensors 808 may include optical sensors and pose sensors as described above. As discussed in more detail below with respect to FIG. 9, the sensors 808 may include any suitable number and/or combination of sensors for determining a position, orientation, and/or other movement characteristics of the HMD device 36 in up to six degrees of freedom.

The sensor data 46 may be provided to a tracking and mapping module 812 that includes two separate tracking filters that may operate in parallel. A 6DOF tracking filter 816 may be configured to output an estimated pose 54 comprising a location and an orientation of the HMD device in six degrees of freedom based on the sensor data 46. The estimated pose 54 of the 6DOF tracking filter 816 represents highly precise and accurate rotational and translational pose data that typically relies on visible light or other optical information. In particular, a translational pose/location of the HMD device 36 may be estimated relative to other real-world objects 34 in a real-world environment based on optical feedback of the environment.

Further, the 6DOF tracking filter 816 may map the real-world environment to a virtual model to determine the location of the HMD device 36 relative to other real-world objects 34. Further, in some embodiments, the optical information may be used in combination with information from pose sensors to estimate the rotational pose/orientation of the HMD device 36. As noted above, due to its reliance on visible light the 6DOF tracking filter 816 may be highly dependent on environmental conditions of the physical environment in which the HMD device 36 is located.

A 3DOF tracking filter 820 may be configured to output an estimated pose 54 corresponding to an orientation of the HMD device 36 in three degrees of freedom based on sensor data 46 of the pose sensors. In some embodiments, the estimated pose 54 of the 3DOF tracking filter 820 may be based sensor information from various sensors that do not rely on visible light or other optical information.

Estimated poses 54 of the HMD device 36 in six degrees of freedom and/or three degrees of freedom may be provided to a pose filter 824. The pose filter 824 may be configured to analyze and/or adjust the estimated poses 54. For example, image data from sensors 808 may have one or more characteristics, such as low texture in a scene or image blur, that generate inaccuracies in the estimated location of features in the image. The pose filter 824 may analyze such image data and other sensor data 46 to determine one or more input uncertainty values 830 of such data.

As noted above, a variety of factors and conditions of the real-world environment may influence uncertainty associated with sensor data. Such factors may include, but are not limited to, illumination of real-world objects, scene depth, scene motion, and feature density. For example, a scene that includes numerous real-world objects and/or people in motion may heighten uncertainties associated with image data of the scene, and may therefore make reliable 6DOF tracking more difficult.

In one example, acceleration data from an accelerometer may be analyzed to determine an input uncertainty value 830 for a translation component. Additionally, rotation data from a gyroscope may be analyzed to determine an input uncertainty value 830 for a rotation component. The pose filter 824 may utilize geometric averages, harmonic means, or any other suitable method for determining such input uncertainty values 830. In some examples, the uncertainties for each input or dimension may be expressed as covariances for that dimension. Further, the pose filter 824 may analyze uncertainty in any suitable number of dimensions.

The input uncertainty values 830 may be mapped to an estimated quality level 804 of a world-lock display mode experience. For example, uncertainty in a six degree of freedom pose estimate may be represented by a 6×6 covariance matrix comprising three rotation components and 3 translation components. The diagonal in the matrix represents an uncertainty of each of the individual axes that represent each of the three rotational angles and each of the three translation directions.

The various covariances may be collapsed to yield a single covariance that is compared to a quality level threshold 838 and/or to the plurality of quality levels 842 to yield an estimated quality level 804. Such estimated quality level 804 may represent an estimated quality of a 6×6 DOF world-lock display mode experience. The tracking system 14 may then output the estimated quality level 804 in the form of feedback 42 to the user 50 as described above.

As shown in FIG. 8, in some example the estimated poses 54 outputted by the tracking system 14 may be looped back into the pose filter 824. In this manner, the pose filter 824 may analyze an estimated pose 54 to determine one or more pose uncertainty values 850 of the pose(s). Similar to determining the input certainty values 830, a covariance matrix may be created for the estimated pose 54 to determine a pose uncertainty value 850 for a given estimated pose 54.

In some examples, both input uncertainty values 830 and pose uncertainty values 850 may be calculated and mapped to an estimated quality level 804. In other examples, input uncertainty values 830 may be calculated and mapped to an estimated quality level 804, while pose uncertainty values 850 are not determined or utilized. These examples may be utilized, for example, when the 3DOF tracking filter 820 is operated and the 6DOF tracking filter 816 is not operated. In other examples, pose uncertainty values 850 may be calculated and mapped to an estimated quality level 804, while input uncertainty values 830 are not determined or utilized.

It will be understood that the input uncertainty values 830, pose uncertainty values 850, estimated poses 54 and estimated quality levels 804 may be determined in any suitable manner without departing from the scope of the present disclosure. For example, the tracking and mapping module 812 may monitor tick-by-tick sensor data input into the tracking system 14, and may assess and adjust the estimated poses 54 and estimated quality levels 834 over longer periods of time.

In some embodiments, the tracking system may be implemented in hardware, such as a processing pipeline including various logical blocks or pipe stages. In some embodiments, the tracking system may be implemented as software instructions executed by a processor. In some embodiments, the tracking system may be implemented as a combination of hardware and software.

Figure 9:
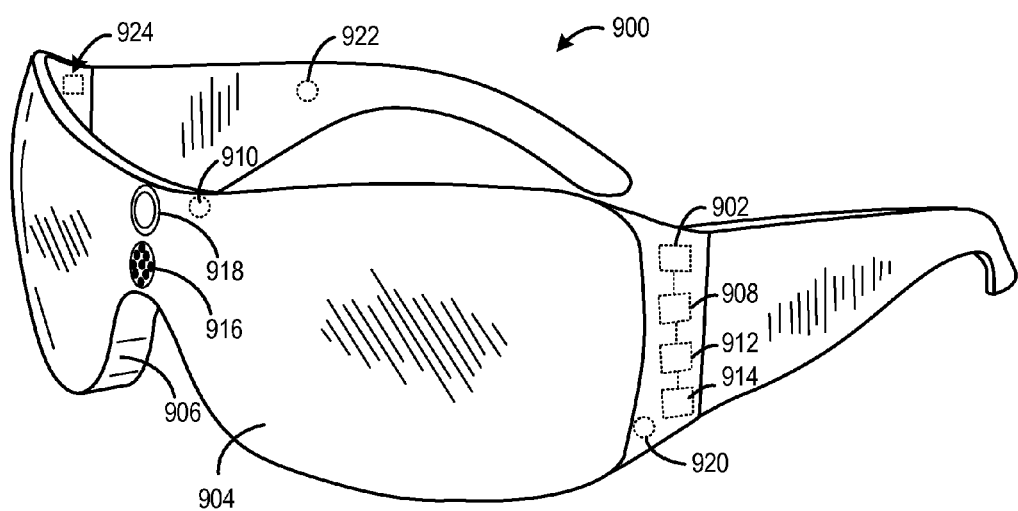
FIG. 9 shows an example head-mounted display device according to an embodiment of the present disclosure.

With reference now to FIG. 9, one example of an HMD device 900 in the form of a pair of wearable glasses with a transparent display is provided. It will be appreciated that in other examples, the HMD device 900 may take other suitable forms in which a transparent, semi-transparent, and/or non-transparent display is supported in front of a viewer's eye or eyes. It will also be appreciated that the HMD device shown in FIGS. 1-7 may take the form of the HMD device 900, as described in more detail below, or any other suitable HMD device.

The HMD device 900 includes a display system 902 and a see-through or transparent display 904 that enables images such as holographic objects to be delivered to the eyes of a wearer of the HMD device. The transparent display 904 may be configured to visually augment an appearance of a real-world, physical environment to a wearer viewing the physical environment through the transparent display. For example, the appearance of the physical environment may be augmented by graphical content (e.g., one or more pixels each having a respective color and brightness) that is presented via the transparent display 904 to create an augmented reality environment.

The transparent display 904 may also be configured to enable a wearer of the HMD device to view a physical, real-world object in the physical environment through one or more partially transparent pixels that are displaying a virtual object representation. As shown in FIG. 9, in one example the transparent display 904 may include image-producing elements located within lenses 906 (such as, for example, a see-through Organic Light-Emitting Diode (OLED) display). As another example, the transparent display 904 may include a light modulator on an edge of the lenses 906. In this example, the lenses 906 may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating an augmented reality environment.

The HMD device 900 may also include various sensors and related systems. For example, the HMD device 900 may include a gaze tracking system 908 that includes one or more image sensors configured to acquire image data in the form of gaze tracking data from a wearer's eyes. Provided the wearer has consented to the acquisition and use of this information, the gaze tracking system 908 may use this information to track a position and/or movement of the wearer's eyes.

In one example, the gaze tracking system 908 includes a gaze detection subsystem configured to detect a direction of gaze of each eye of a wearer. The gaze detection subsystem may be configured to determine gaze directions of each of a wearer's eyes in any suitable manner. For example, the gaze detection subsystem may comprise one or more light sources, such as infrared light sources, configured to cause a glint of light to reflect from the cornea of each eye of a wearer. One or more image sensors may then be configured to capture an image of the wearer's eyes.

Images of the glints and of the pupils as determined from image data gathered from the image sensors may be used to determine an optical axis of each eye. Using this information, the gaze tracking system 908 may then determine a direction the wearer is gazing. The gaze tracking system 908 may additionally or alternatively determine at what physical or virtual object the wearer is gazing. Such gaze tracking data may then be provided to the HMD device 900.

It will also be understood that the gaze tracking system 908 may have any suitable number and arrangement of light sources and image sensors. For example and with reference to FIG. 9, the gaze tracking system 908 of the HMD device 900 may utilize at least one inward facing sensor 910.

The HMD device 900 may also include sensor systems that receive physical environment data from the physical environment. For example, the HMD device 900 may also include a head tracking system 912 that utilizes one or more pose sensors, such as pose sensors 914 on HMD device 900, to capture head pose data and thereby enable position tracking, direction/location and orientation sensing, and/or motion detection of the wearer's head. Accordingly and as described above, the tracking system 14 of FIG. 8 may receive sensor data from pose sensors 914 that enable the orientation of the HMD device 900 to be estimated in three degrees of freedom or the location and orientation of the HMD device to be estimated in six degrees of freedom.

In one example, head tracking system 912 may comprise an inertial measurement unit (IMU) configured as a three-axis or three-degree of freedom position sensor system. This example position sensor system may, for example, include three gyroscopes to indicate or measure a change in orientation of the HMD device 900 within 3D space about three orthogonal axes (e.g., x, y, and z, or roll, pitch, and yaw). The orientation derived from the sensor signals of the IMU may be used to display, via the transparent display 904, one or more virtual objects with a body-locked position in which the position of each virtual object appears to be fixed relative to the wearer of the see-through display and the position of each virtual object appears to be moveable relative to real-world objects in the physical environment.

In another example, head tracking system 912 may comprise an IMU configured as a six-axis or six-degree of freedom position sensor system. This example position sensor system may, for example, include three accelerometers and three gyroscopes to indicate or measure a change in location of the HMD device 900 along the three orthogonal axes and a change in device orientation about the three orthogonal axes.

The head tracking system 912 may also support other suitable positioning techniques, such as GPS or other global navigation systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

In some examples, the HMD device 900 may also include an optical sensor system that utilizes one or more outward facing sensors, such as optical sensor 916 on HMD device 900, to capture image data. The outward facing sensor(s) may detect movements within its field of view, such as gesture-based inputs or other movements performed by a wearer or by a person or physical object within the field of view. The outward facing sensor(s) may also capture 2D image information and depth information from the physical environment and physical objects within the environment. For example, the outward facing sensor(s) may include a depth camera, a visible light camera, an infrared light camera, and/or a position tracking camera.

The optical sensor system may include a depth tracking system that generates depth tracking data via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples, a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. For example, illumination may be provided by an infrared light source 918. It will be appreciated that any other suitable depth camera may be used within the scope of the present disclosure.

The outward facing sensor(s) may capture images of the physical environment in which a wearer of the HMD device is situated. With respect to the HMD device 900, in one example an augmented reality display program may include a 3D modeling system that uses such captured images to generate a virtual environment that models the physical environment surrounding the wearer of the HMD device. In some embodiments, the optical sensor 916 may cooperate with the IMU to determine the location and the orientation of the HMD device 900 in six degrees of freedom. Such location and orientation information may be used to display, via the transparent display 904, one or more virtual objects with a world-locked position in which a position of each virtual object appears to be fixed relative to real-world objects viewable through the transparent display, and the position of each virtual object appears to be moveable relative to a wearer of the see-through display.

The HMD device 900 may also include a microphone system that includes one or more microphones, such as microphone 920, that capture audio data. In other examples, audio may be presented to the wearer via one or more speakers, such as speaker 922 on the HMD device 900.

The HMD device 900 may also include a controller, such as controller 924. The controller 924 may include a logic machine and a storage machine, as discussed in more detail below with respect to FIG. 11, that are in communication with the various sensors and systems of the HMD device 900. In one example, the storage machine may include instructions that are executable by the logic machine to receive signal inputs from the sensors, determine a pose of the HMD device 900, and adjust display properties for content displayed via the transparent display 904.

Figure 10A:
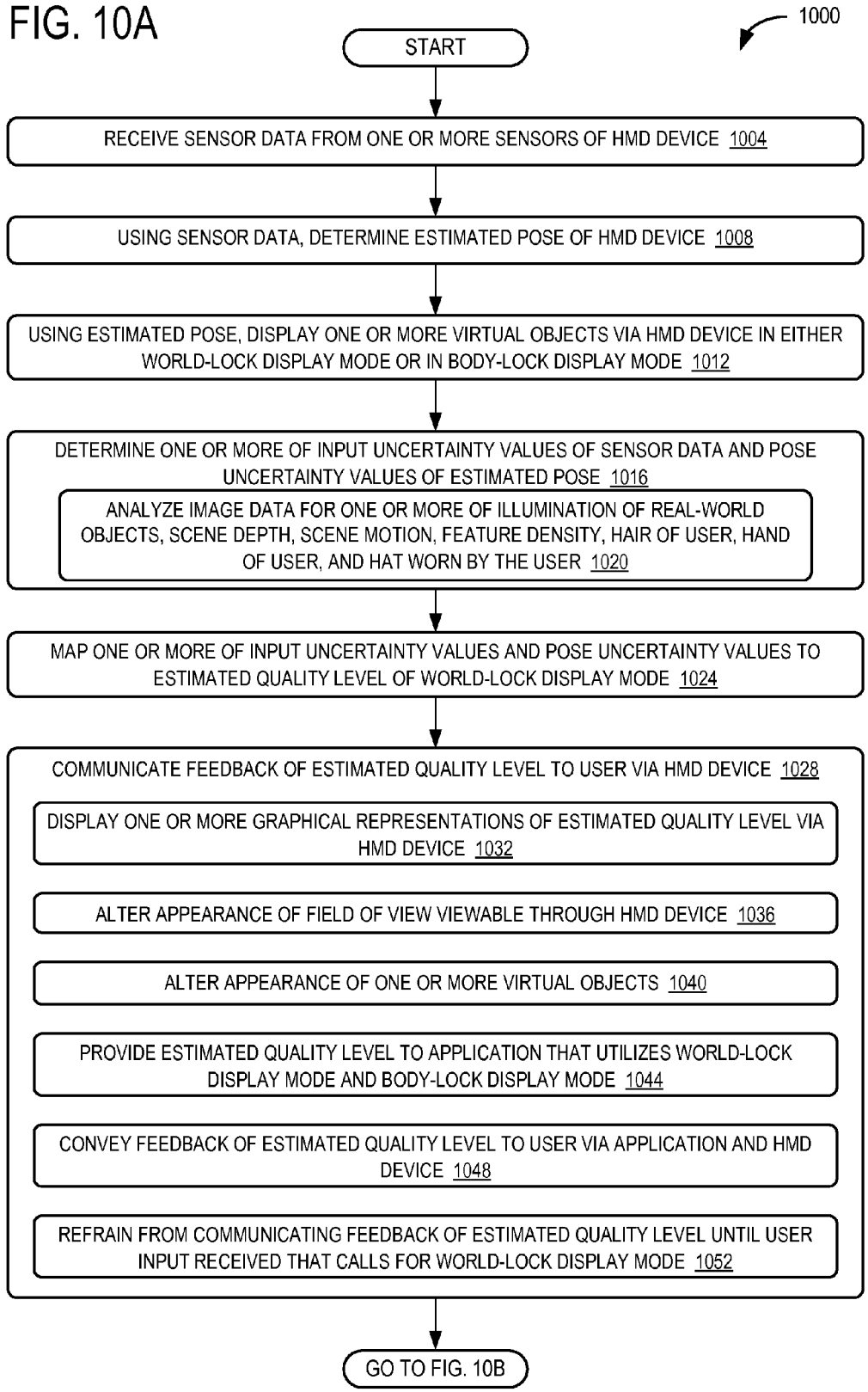
FIGS. 10A and 10B are a flow chart of a method for communicating to a user of a head-mounted display device an estimated quality level of a world-lock display mode according to an embodiment of the present disclosure.
Figure 10B:
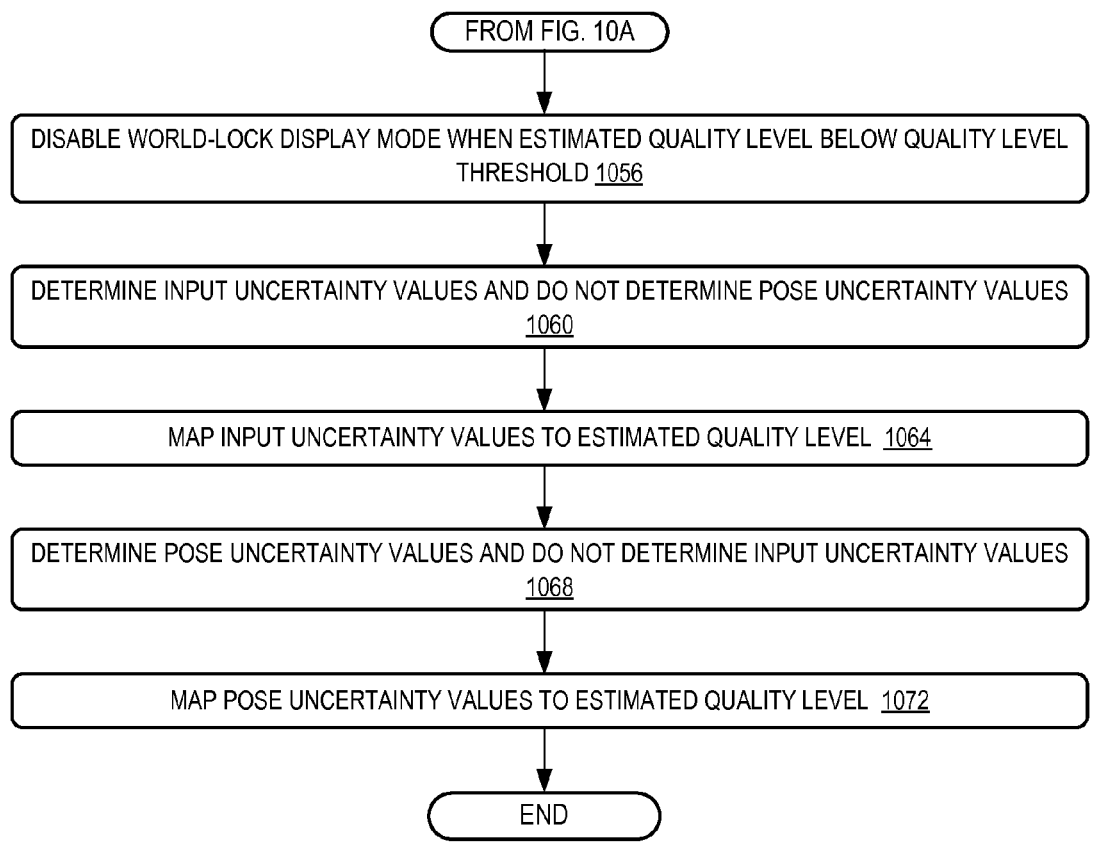

FIGS. 10A and 10B illustrate a flow chart of a method 1000 for communicating to a user of an HMD device an estimated quality level of a world-lock display mode according to an embodiment of the present disclosure. The following description of method 1000 is provided with reference to the software and hardware components of the augmented reality system 10 described above and shown in FIGS. 1-9. It will be appreciated that method 1000 may also be performed in other contexts using other suitable hardware and software components.

With reference to FIG. 10A, at 1004 the method 1000 may include receiving sensor data from one or more sensors of the head-mounted display device. At 1008 the method 1000 may include, using the sensor data, determining an estimated pose of the head-mounted display device. At 1012 the method 1000 may include, using the estimated pose, displaying the one or more virtual objects via the head-mounted display device in either the world-lock display mode or in the body-lock display mode. At 1016 the method 1000 may include determining one or more of input uncertainty values of the sensor data and pose uncertainty values of the estimated pose. At 1020 the step of determining one or more of input uncertainty values and pose uncertainty values may comprise analyzing image data for one or more of illumination of the real-world objects, a scene depth, scene motion, feature density, hair of the user, a hand of the user, and a hat worn by the user.

At 1024 the method 1000 may include mapping one or more of the input uncertainty values and the pose uncertainty values to the estimated quality level of the world-lock display mode. At 1028 the method 1000 may include communicating feedback of the estimated quality level to the user via the head-mounted display device. At 1032 the method 1000 may include displaying one or more graphical representations of the estimated quality level via the head-mounted computing device. At 1036 the method 1000 may include communicating feedback of the estimated quality level by altering an appearance of a field of view viewable through the head-mounted display device. At 1040 the method 1000 may include communicating feedback of the estimated quality level by altering an appearance of one or more virtual objects.

At 1044 the method 1000 may include communicating feedback of the estimated quality level by providing the estimated quality level to an application that utilizes the world-lock display mode and the body-lock display mode. At 1048 the method 1000 may include conveying the feedback of the estimated quality level to the user via the application and the HMD device. At 1052 the method 1000 may include refraining from communicating the feedback of the estimated quality level until a user input is received that calls for the world-lock display mode.

With reference now to FIG. 10B, at 1056 the method 1000 may include disabling the world-lock display mode when the estimated quality level is below a quality level threshold. At 1060 the method 1000 may include determining the input uncertainty values and not determining the pose uncertainty values. At 1064 the method 1000 may include mapping the input uncertainty values to the estimated quality level. At 1068 the method 1000 may include determining the pose uncertainty values and not determining the input uncertainty values. At 1072 the method 1000 may include mapping the pose uncertainty values to the estimated quality level.

The above described method 1000 may be performed to apprise users of an estimated quality level of a world-lock display mode via one or more forms of feedback provided by an HMD device. In this manner, users may be afforded a richer and more informative augmented reality user experience.

It will be appreciated that method 1000 is provided by way of example and is not meant to be limiting. Therefore, it is to be understood that method 1000 may include additional and/or alternative steps than those illustrated in FIGS. 10A and 10B. Further, it is to be understood that method 1000 may be performed in any suitable order. Further still, it is to be understood that one or more steps may be omitted from method 1000 without departing from the scope of this disclosure.

Figure 11:
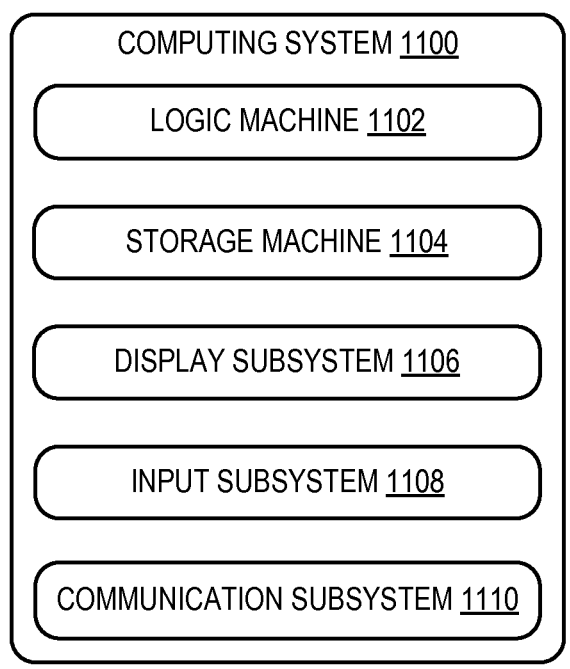
FIG. 11 is a simplified schematic illustration of an embodiment of a computing device.

FIG. 11 schematically shows a non-limiting embodiment of a computing system 1100 that can enact one or more of the methods and processes described above. Computing system 1100 is shown in simplified form. Computing system 1100 may take the form of one or more HMD devices or one or more devices cooperating with an HMD device (e.g., personal computers, server computers, tablet computers, home-entertainment computers, network computing devices, gaming devices, mobile computing devices, mobile communication devices (e.g., smart phones), and/or other computing devices).

Computing system 1100 includes a logic machine 1102 and a storage machine 1104. Computing system 1100 may optionally include a display subsystem 1106, input subsystem 1108, communication subsystem 1110, and/or other components not shown in FIG. 11. Computing system 1100 may also include computer readable media, with the computer readable media including computer readable storage media and computer readable communication media. Further, in some embodiments the methods and processes described herein may be implemented as a computer application, computer service, computer API, computer library, and/or other computer program product in a computing system that includes one or more computers.

Logic machine 1102 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1104 includes one or more physical devices configured to hold machine-readable instructions executable by the logic machine to implement the methods and processes described herein. When such methods and processes are implemented, the state of storage machine 1104 may be transformed—e.g., to hold different data.

Storage machine 1104 may include removable and/or built-in devices. Storage machine 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

It will be appreciated that storage machine 1104 includes one or more physical devices. However, aspects of the instructions described herein alternatively may be propagated by a communication medium (e.g., an electromagnetic signal, an optical signal, etc.) that is not held by a physical device for a finite duration. Furthermore, data and/or other forms of information pertaining to the present disclosure may be propagated by a pure signal via computer-readable communication media.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1106 may be used to present a visual representation of data held by storage machine 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology, such as transparent display 904 of the HMD device 900 shown in FIG. 9. Such display devices may be combined with logic machine 1102 and/or storage machine 1104 in a shared enclosure, or such display devices may be peripheral display devices.

When included, input subsystem 1108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; electric-field sensing componentry for assessing brain activity; any of the sensors described above with respect to head tracking system 912 of FIG. 9; and/or any other suitable sensor.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

The terms "program" and "module" may be used to describe an aspect of the augmented reality system 10 that is implemented to perform one or more particular functions. In some cases, such a program or module may be instantiated via logic machine 1102 executing instructions held by storage machine 1104. It is to be understood that different programs and modules may be instantiated from the same application, service, code block, object, library, routine, API, function, etc. Likewise, the same program or module may be instantiated by different applications, services, code blocks, objects, routines, APIs, functions, etc. The terms "program" and "module" are meant to encompass individual or groups of executable files, data files, libraries, drivers, scripts, database records, etc.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for communicating to a user of a head-mounted display device an estimated quality level of a world-lock display mode in which a position of one or more virtual objects appears to be fixed relative to real-world objects viewable through the head-mounted display device, the method comprising:

receiving sensor data from one or more sensors of the head-mounted display device;

using the sensor data, determining an estimated pose of the head-mounted display device;

using the estimated pose, displaying the one or more virtual objects via the head-mounted display device in either the world-lock display mode or in a body-lock display mode in which the position of each of the virtual objects appears to be fixed relative to the user of the head-mounted display device;
determining one or more input uncertainty values of the sensor data;
mapping the one or more input uncertainty values to the estimated quality level of the world-lock display mode; and
communicating feedback of the estimated quality level to the user via the head-mounted display device.

2. The method of claim 1, wherein communicating feedback of the estimated quality level further comprises displaying one or more graphical representations of the estimated quality level via the head-mounted computing device.

3. The method of claim 2, wherein displaying the one or more graphical representations comprises altering an appearance of a field of view viewable through the head-mounted display device.

4. The method of claim 2, wherein displaying the one or more graphical representations comprises altering an appearance of the one or more virtual objects.

5. The method of claim 1, wherein communicating feedback of the estimated quality level further comprises:
providing the estimated quality level to an application that utilizes the world-lock display mode and the body-lock display mode; and
conveying the feedback of the estimated quality level to the user via the application and the head-mounted display device.

6. The method of claim 1, wherein communicating feedback of the estimated quality level further comprises refraining from communicating the feedback of the estimated quality level until a user input is received that calls for the world-lock display mode.

7. The method of claim 1, further comprising disabling the world-lock display mode when the estimated quality level is below a quality level threshold.

8. The method of claim 1, wherein determining the input uncertainty values further comprises analyzing image data for one or more of illumination of the real-world objects, a scene depth, scene motion, feature density, hair of the user, a hand of the user, and a hat worn by the user.

9. The method of claim 1, further comprising:
determining pose uncertainty values of the estimated pose; and
mapping the pose uncertainty values to the estimated quality level.

10. A head-mounted display device operatively connected to a computing device, the head-mounted display device comprising:
a tracking system executed by a processor of the computing device, the tracking system configured to:
receive sensor data from one or more sensors of the head-mounted display device;
using the sensor data, determine an estimated pose of the head-mounted display device;
determine one or more input uncertainty values of the sensor data;
map the one or more input uncertainty values to an estimated quality level of a world-lock display mode in which a position of one or more virtual objects appears to be fixed relative to real-world objects viewable through the head-mounted display device; and
communicate feedback to a user via the head-mounted display device of the estimated quality level; and a display program executed by a processor of the computing device, the display program configured to display the one or more virtual objects using the estimated pose in either the world-lock display mode or in a body-lock display mode in which the position of each of the virtual objects appears to be fixed relative to the user of the head-mounted display device.

11. The head-mounted display device of claim 10, wherein the tracking system is configured to communicate the feedback of the estimated quality level by causing the display program to display one or more graphical representations of the estimated quality level via the head-mounted computing device.

12. The head-mounted display device of claim 11, wherein causing the display program to display one or more graphical representations comprises causing the display program to display one or more graphical representations in the body-lock display mode in which the one or more graphical representations appear to be fixed relative to the user of the head-mounted display device.

13. The head-mounted display device of claim 11, wherein causing the display program to display one or more graphical representations comprises altering an appearance of the one or more virtual objects.

14. The head-mounted display device of claim 10, wherein the tracking system is configured to communicate the feedback of the estimated quality level by providing the estimated quality level to an application that utilizes the world-lock display mode and the body-lock display mode, wherein the application conveys the feedback of the estimated quality level to the user via the head-mounted display device.

15. The head-mounted display device of claim 10, wherein the tracking system is configured to communicate the feedback of the estimated quality level by refraining from communicating the feedback until a user input is received that calls for the world-lock display mode.

16. The head-mounted display device of claim 10, wherein the tracking system is further configured to disable the world-lock display mode when the estimated quality level is below a quality level threshold.

17. The head-mounted display device of claim 10, wherein the tracking system is configured to:
determine both the input uncertainty values and pose uncertainty values of the estimated pose; and
map both the input uncertainty values and the pose uncertainty values to the estimated quality level.

18. A method for communicating to a user of a head-mounted display device an estimated quality level of a world-lock display mode in which a position of one or more virtual objects appears to be fixed relative to real-world objects viewable through the head-mounted display device, the method comprising:
receiving sensor data from one or more sensors of the head-mounted display device;
using the sensor data, determining an estimated pose of the head-mounted display device;
using the estimated pose, displaying the one or more virtual objects via the head-mounted display device in either the world-lock display mode or in a body-lock display mode in which the position of each of the virtual objects appears to be fixed relative to the user of the head-mounted display device;
determining one or more input uncertainty values of the sensor data;

mapping the one or more input uncertainty values to the estimated quality level of the world-lock display mode; and displaying one or more graphical representations of the estimated quality level to the user via the head-mounted computing device.

\* \* \* \* \*